United States Patent [19]

Murakami

[11] 3,978,743

[45] Sept. 7, 1976

[54] FLUID PRESSURE CONTROL SYSTEM FOR AUTOMATIC TRANSMISSION

[75] Inventor: Noboru Murakami, Nagoya, Japan

[73] Assignee: Aisin Seiki Kabushiki Kaisha, Kariya, Japan

[22] Filed: Sept. 16, 1974

[21] Appl. No.: 506,330

[30] Foreign Application Priority Data

Sept. 27, 1973  Japan.............................. 48-104735

[52] U.S. Cl. ................................................ 74/869
[51] Int. Cl.[2] ......................................... B60K 41/18
[58] Field of Search ............. 74/863, 864, 867, 868, 74/869, 752 C, 865

[56] References Cited
UNITED STATES PATENTS

| | | | |
|---|---|---|---|
| 3,561,296 | 2/1971 | Iijima................................... | 74/869 |
| 3,643,527 | 2/1972 | Ohruma................................ | 74/868 |
| 3,707,891 | 1/1973 | Asano et al........................... | 74/869 |
| 3,733,932 | 5/1973 | Uozumi et al. ...................... | 74/869 |
| 3,752,015 | 8/1973 | Murakami............................. | 74/869 |
| 3,800,629 | 4/1974 | Lentz............................ | 74/752 C X |
| 3,831,465 | 8/1974 | Murakami............................. | 74/869 |
| 3,859,873 | 1/1975 | Miyauchi et al................... | 74/868 X |
| 3,871,250 | 3/1975 | Miyauchi et al................... | 74/867 X |

*Primary Examiner*—Samuel Scott
*Assistant Examiner*—Lance W. Chandler
*Attorney, Agent, or Firm*—Pierce, Scheffler & Parker

[57] ABSTRACT

A fluid pressure control system for automatic transmission includes a fluid pressure source, a fluid pressure regulating valve for regulating the fluid from the source to a particular line pressure, and a plurality of frictional engaging devices, adapted to be actuated by the line pressure through means of a manual shift valve, for attaining a particular gear ratio within the gear trains of the transmission which are interposed between the input and output shafts. A governor valve generates a governor pressure in response to the rotational speed of the input shaft, a throttle valve generates a throttle pressure in response to the engine throttle valve, and a shift valve selectively actuates the frictional engaging devices in response to the governor and throttle pressures.

4 Claims, 3 Drawing Figures

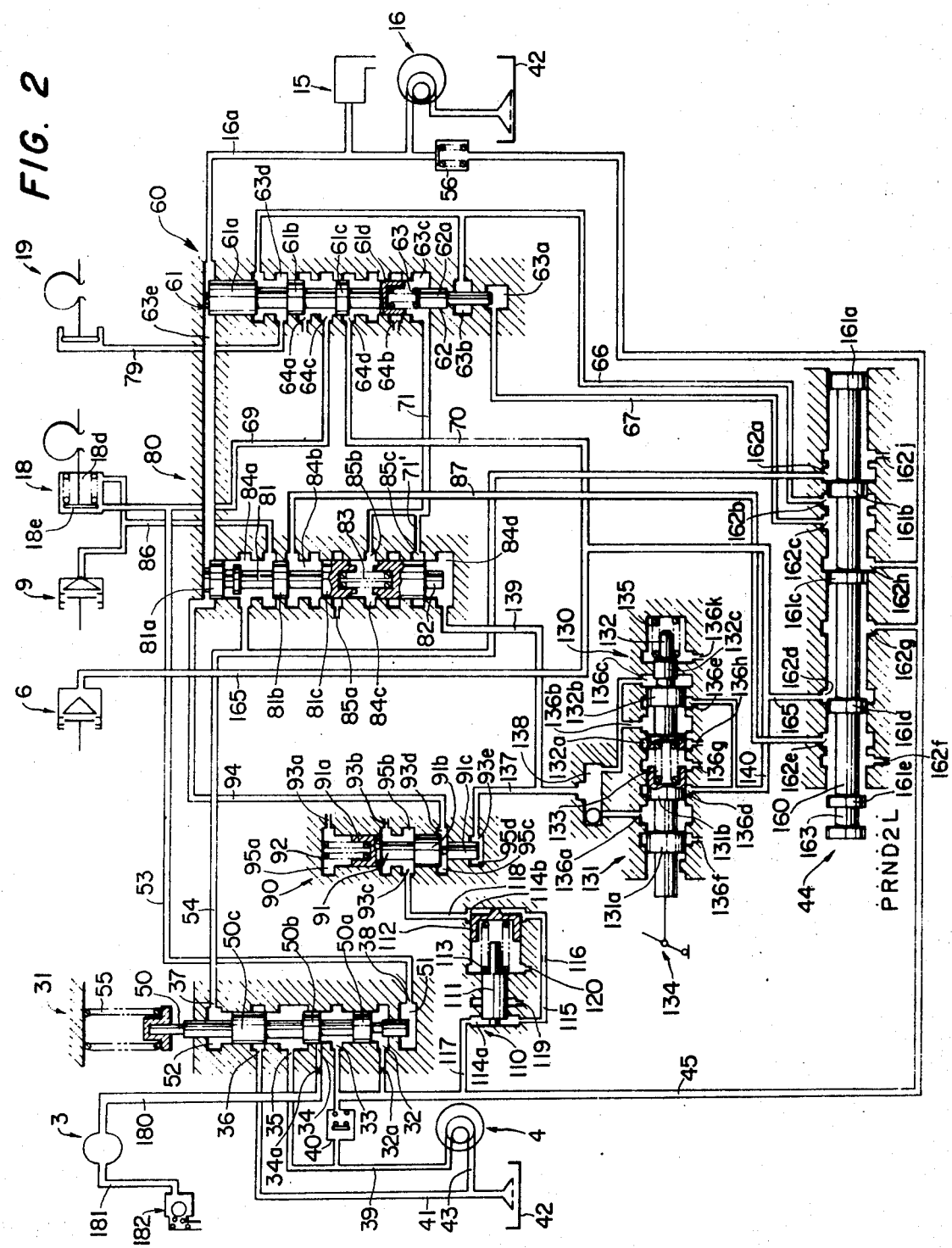

FLUID PRESSURE CONTROL SYSTEM FOR AUTOMATIC TRANSMISSION

BACKGROUND OF THE INVENTION

This invention relates to an automatic transmission for vehicle and more particularly to a fluid pressure control system for governing a planetary or epicyclic gear trains employed in the transmission.

As used herein, the term "low position" refers to a high ratio differential achieved by the planetary gear trains adapted for the slowest travelling speed of the vehicle.

The term "second position" refers to a middle level ratio differential achieved by the gear trains adapted for the middle level vehicle travelling speed.

The term "top position" refers to a position in which the entire mechanism of the gear trains is locked together as a unit and is rotated in integral with an input shaft for achieving a higher travelling speed of the vehicle.

Known automatic transmissions adapted for vehicles are not ordinarily able to completely interrupt torque transmission although acceleration pedal is completely released by the vehicle driver in case where the vehicle stops travelling as in conformity with the traffic signal on the roads.

SUMMARY OF THE INVENTION

A principal object of the present invention therefore is to provide a fluid pressure control system having improved means for reducing a residual fluid pressure in the control system in case where the acceleration pedal is released, namely the vehicle travelling is substantially stopped.

The foregoing object and others are attained according to at least one aspect of the present invention through the provision of a creep preventing means to reduce a residual fluid pressure in various clutch or brake devices employed in the planetary gear trains of the transmission.

Thus, in the disclosed embodiments, a creep preventing valve is provided to have the input pressure escape into a reservoir in response to release of the acceleration pedal by the vehicle driver.

BRIEF DESCRIPTION OF THE DRAWINGS

FIG. 2 is a diagrammatic illustration of a fluid control system for the transmission gearing.

DETAILED DESCRIPTION OF THE PREFERRED EMBODIMENTS

Figure 1:
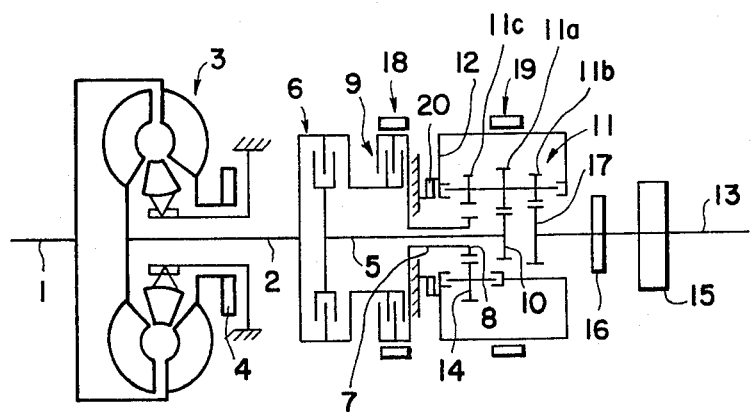
FIG. 1 is a diagrammatic view of a transmission gearing according to the invention.

In FIG. 1 is shown an outline of an automatic transmission with which cooperates the fluid pressure control system according to the invention. An input shaft 1 drives a first middle shaft 2 through a torque convertor 3. An oil pump 4 is driven by means of the vehicle engine not shown through the input shaft 1 and the oil pump thereby is transmitted into the oil pressure control circuit as will be described in detail as the description proceeds. The first middle shaft 2 drives a second middle shaft 5 through a clutch 6. On the second shaft 5 is a free running fit a hollow shaft 7. At one end of the hollow shaft 7 is formed with second sun gear 8 and at the other end thereof is provided with a second clutch 9. The second middle shaft 5 has a first sun gear 10 at its right hand end. The first sun gear 10 meshes with a middle gear 11a of a planetary gear set generally indicated by the reference character 11. The planetary gear set 11 is rotatably supported on a planetary carrier 12. The planetary gear set 11 also has gears 11b and 11c both integral with the other gear 11a. The gear 11b meshes with a third sun gear 17 which is fast on an output shaft 13 of the fluid transmission. The gear 11c meshes with an idle gear 14 which in turn meshes with the second sun gear 8. In FIG. 1, the gears 11c and 14 are shown in a disengagement manner for mere illustration convenience. The carrier 12 is rotatable coaxially with the second middle shaft 5. The input shaft 1, the first and second middle shafts 2 and 5 and the output shaft 13 are in alignment with one another. The governor 15 is driven by the output shaft 13 and its output pressure is proportional to a rotational speed of the output shaft 13. The governor is of conventional construction and its operation and use is well known in the art so that detailed description is not required for full understanding of the invention. The reference character 16 indicates another oil pump driven by the output shaft 13. The output fluid pressure from the oil pump 16 is governed by the valve 15 in dependency upon the rotational speed of the output shaft 13. Such output fluid pressure is used for the control system according to the invention as hereinbelow described as the discussion proceeds.

A brake 18 for provided for achieving prohibition and allowance of the rotation of the hollow shaft 7. Another brake 19 is provided for achieving prohibition and allowance of the rotation of the carrier 12. The brakes 18 and 19 operate due to fluid pressure applied thereto from the oil pump 4 or 16. A brake 20 prevents rotation of the carrier 12 in one direction while permitting the reverse direction as one-way brake.

In the application of the gear trains, there are four modes of operation. The first mode of operation is achieved by keeping the gear trains in the low position, the second mode of operation is achieved by keeping the gear train in the second position, and the third mode of operation is achieved by keeping the gear train in the top position. The fourth mode of operation is achieved when the gear trains is in a position in which the output shaft is driven in the inverse rotational direction, rearward travelling of the vehicle being thus effected.

In the first mode of operation, the clutch 6 and the brake 19 are in their operation position while the clutch 9 and the brake 18 are in rest position. As a result, the input torque is transmitted from the input shaft 1 via torque converter 3, first middle shaft 2, clutch 6, second middle shaft 5, first sun gear 10, middle gear 11a, gear 11b, third sun gear 17 and output shaft 13 to driving wheels of the vehicle (not shown). In the mode, the carrier is kept stationary. The low position, namely the highest ratio differential of the gear train result from the first mode and the large pulling power of the vehicle is obtained at the low travelling speed.

In the second mode of operation, the clutch 6 is in act and the clutch 9 and brake 18 are in the rest position while the brake 19 is released but is replaced by the brake 20. Since the brake 20 is operative in preventing the carrier 12 from rotating in a reaction torque direction in the low position, the same low position is achieved in that second mode of operation. If the brake 18 becomes operated in the second mode of operation, the second sun gear 8 becomes stationary and the carrier 12 is applied the reverse direction reaction torque. As a result, the brake 20 permits rotation of the carrier in such rotational direction. Since the second sun gear 8 is stationary and the carrier 12 is rotatable, rotation of the first sun gear 10 is transmitted to the output shaft 13 with a result that the shaft 13 is rotated with a ratio differential lower than that of the low position. A middle level travelling speed thus may be effected for the vehicle.

In the third mode of operation, both clutches 6 and 9 are in act while the brakes 18 and 19 are in rest posion. As a result, both sun gears 10 and 8 becomes integral. The entire mechanism of the gear trains is locked together as a unit and is rotated in integral with the first middle shaft 2 and the output shaft 13. The top position is thus effected and the high travelling speed of the vehicle may be achieved.

In the fourth mode of operation, the clutch 9 and the brake 19 are in act while the clutch 6 and the brake 18 are inoperative. The carrier 12 is kept stationary and the second sun gear 8 becomes driving gear so that the sun gear 8 drives, via idle gear 14, gear 11c, gear 11b and the third sun gear 17, the output shaft 13 in the direction reverse to that of the first to third modes of operation. The rearward travelling of the vehicle is thus effected.

If both clutches 6 and 9 and both brake 18 and 19 are all in the rest position, no torque is transmitted from the input shaft 1 to the output shaft 13. This mode is referred to as neutral mode herein.

In FIG. 2, an oil pump 4 is driven by the vehicle engine (not shown) and the oil pumped thereby is transmitted into the pressure control circuit. A regulator valve, generally indicated by the reference character 31, includes ports 32 to 38. The pressurized oil from the pump 4 is transmitted via conduit 39 and check valve 40 to port 33 and via conduit 39, check valve 40 and conduit 45 to port 32. The pressurized oil is also transmitted into the port 35 through means of conduit 39. A conduit 41 connects the port 36 with a reservoir 42. A suction pipe 43 of the pump 4 leads to the reservoir 42. The torque converter 3 is supplied the lubricant oil through means of conduit 180 from the port 34. A check valve 182 is connected to the torque converter 3 through means of conduit 181 to have the fluid escape at a pressure exceeding a predetermined value. An orifice 34a is provided on the conduit 180 to keep the fluid pressure to the converter at a lower value than that of pressure which is applied to the clutches and brakes. The ports 32 and 33 are connected to the manually shiftable valve, generally indicated by the reference character 44, through means of conduit 45.

The regulator valve 31 includes a valve spool 50 having three lands 50a, 50b and 50c and fluid chambers 51 and 52. The lands are of the same diameter and cooperate with the ports selectively to regulate the input pressure as a pressure suitable to apply to the clutches and the brakes. Such suitable or proper fluid pressure is referred to hereinafter as "line pressure." The spool 50 is applied on its lowermost end face the line pressure. The lands 50c and 50a are also applied the line pressure within the chambers 52 and 32 respectively. An orifice 32a is provided at the port 32 for preventing the spool from vibration when the line pressure is applied through the conduit 45.

The chamber 51 is connected fluidically to a first shift valve, generally indicated by the reference character 60, through means of conduits 53 and 69 and the chamber 52 is fluidically connected to the manual shift valve 44 through means of 54. When the oil pressure is applied to the lower face of the land 50a of the spool 50 through the port 32, the opening and closing of a discharging port 36 of the valve 31 is controlled by means of the land 50c of the valve spool against the biasing force of a restoring spring 55, which is associated with the end of spool 50 opposite that end upon which is disposed land 50a. The pressure applied to the lower face of the land 50a may be associated with a line pressure transmitted into the chamber 51 as more fully described as the discussion proceeds. As a result of such controlling achieved by the land 50c and the port 36, a regulated output line pressure is supplied to the conduit 45 owing to a calibration threshold of the spring 55. Such regulated line pressure may be decreased by applying a line pressure into the lowermost chamber 51 of the valve 31, by an amount which is proportional to an area of the lowermost end face of the spool 50. The pump 16 which is driven by the output shaft 13 supplies fluid pressure and the governor 15 causes the output pressure of the pump to vary by an amount which is proportional to rotation speed of the shaft 13 representing normally a travelling speed of a vehicle. Immediately after the initiation of operation, an output pressure of the pump 16 overcomes a calibration threshold of a spring of a check valve 56. The fluid pressure is applied to the conduit 45 in addition to the precedingly applied pressure by the other pump 4. The total pressure is higher than the precedingly supplied pressure by the pump 4 alone. As a result the spool 50 of the regulator valve 31 is upward moved a distance which is proportional to a resulting biasing force of the spring 55.

The pressure regulation which precedingly performed by the port 36 and the land 50c is thereafter replaced by the land 50b and port 36 which repeatedly or intermittently permits to connect the ports 36 and 33.

From the foregoing it will be understood that after the pump 16 has become driven by initiation of travel of the vehicle, the ports 35 and 36 are connected and the pump 4 is in idling position. It will be understand that the check valve 40 is thereafter closed and the check valve 56 is opened. Since rotational speed of the engine varies by a large amount, such substitutional employment of the pump 16 is effective to avoid difficulty in calculating a large regulating capacity of the regulating valve 31 as would continuously operate throughout both engine idling and subsequent vehicle travelling periods.

A shift valve 60 similarly includes a valve spool 61, having four lands 61a, 61b, 61c and 61d, and a plug 62 having a land 62a. The first shift valve 60 includes further a compression spring 63 interposed between the spool 61 and plug 62. The lands 61a, 61b, 61c and 61d are of the same diameter and land 62a is of smaller diameter than any other lands of spool 61. Chambers 63a to 63e are defined within the first shift valve 60. The chamber 63a is connected with the manually operable valve 44 through conduit 67 while the other chambers 63b and 63d are also connected with the manual shift valve 44 through conduit 66 and its branch conduits.

The chamber 63c is connected with a second shift valve 80, which will be explained as the discussion proceeds, through a conduit 71. The uppermost chamber 63a is connected with the governor valve 15 and the pump 16 through conduit 16a. The chamber 63e extends to the second shift valve 80. The shift valve 60 has ports 64a and 64b connected with the reservoir 42 through means of conduit (not shown). The valve further has port 64c leading to the first brake 18 through means of conduit 69 and a port 64d connecting via conduits 70 and 165 to the manual shift valve 44.

The second shift valve 80 includes also a valve spool 81 and a plug 82. The spool 81 has three lands 81a, 81b and 81c of the same diameter. The plug 82 has the same diameter as that of the lands and is faced with the spool 81 across a compressed spring 83 which normally biases the spool 81 to the upper direction. The valve 80 has a plurality of chambers 84a to 84d. The valve has a port 85a which is connected to the reservoir 42 through conduit, not shown. The chamber 84a is connected via a branch conduit to the clutch 9 and disengaging chamber 18d of the brake 18. The chamber 84b is connected, in the position of FIG. 2, via a conduit 87, to the manual shift valve 44. The chamber 84c is connected via a port 85b and conduit 71 to the chamber 63c of the first shift valve 60. The valve 80 has further a port 85c connecting via a branch conduit 71' and conduit 71 to the chamber 63c. The fluid pressure transmitted through conduits 71' and 71 to the valve 60 is regulated to a value slightly lower than the pressure within the chamber 84d of the valve 80 by the regulating operation performed by the spool 81 and its associated parts such as the ports 85b and 85a and the spring 83 in the well known manner. Such regulation device is preferred for the valve 60 from a saving view point of diametrical size.

A throttle valve 130 includes a plug 131 having two lands 131a and 131b of the same diameter, movably disposed within the left end portion thereof, a valve spool 132 having three lands 132a to 132c, and a compressed spring 133 interposed between the spool 132 and plug 131, for urging the plug 131 and in turn the acceleration pedal 134 to their rest position. The land 132c is of a smaller diameter than any other lands thereof. Another spring 135 is provided with its one end anchored to the right hand end internal face of the valve 130 and opposite end anchored to the end of the spool 132. This provision of the spring 135 is merely for the sake of assistance to the other spring 133. The throttle valve 130 is provided with three ports 136a, 136b and 136c which are connected via a check valve 138 and conduit 137 to a creep preventing valve 90 and to the second shift valve 80 through the check valve and conduit 137 and further a branch conduit 139. Other ports 136d and 136e are together connected through their branch conduit and a conduit 140 to the manual shift valve 44. Still other ports 136f, 136g, 136h, 136k are all connected to the reservoir 42 through conduit, not shown.

The creep preventing valve 90 has a spool 91 having three lands 91a, 91b and a smaller diameter land 91c, and a spring 92 associated with the upper end of the spool 91 which normally biases the spool 91 in the downward direction as viewed in FIG. 2. The valve 90 includes a plurality of ports 93a to 93e. The ports 93a and 93b are connected to the reservoir 42 through conduit, not shown. The other port 93c is connected to the modulator 110, port 93d is connected via conduit 94 to the governor pressure chamber 63e, and the port 93e is connected via conduit 137 and check valve 138 to throttle valve 130. Four chambers are defined within the valve 90 as indicated by the reference characters 95a to 95d respectively.

The modulator 110 includes a piston 111 and a plug 112 of larger diameter than that of the piston 111. A compressed spring 113 is interposed for urging the piston and the plug into abutment against the end faces of the valve 110. Two chambers 114a and 114b are defined within the valve by the piston 111 and plug 112 and communicated each other through conduit 115 on which is provided a orifice 116 to prevent vibration of the plug 112 when the line pressure is transmitted through branch conduit 117 to the chamber 114b. The other chamber 114b is connected via conduit 118 to the chamber 95b of the creep preventing valve 90. Two ports 119 and 120 communicate with the reservoir through conduit, not shown.

The manual shift valve includes a spool 160 having a plurality of lands 161a to 161e and a plurality of ports 162a to 162h and 162j. At the left end of the spool 160 is formed with a annular groove 163 with which a manual shift lever, not shown, engages for manually shifting the spool to its various acting position designated L, 2, D, N, R, and P. The port 162a connects via conduit 54 to the chamber 84a of the valve 80 and chamber 52 of the regulator valve 31. The port 162b connects via conduit 66 and its branch conduit to the two chambers 63b and 63d. The port 162c is connected through conduit 67 to the chamber 63a of the valve 60. The port 162d is connected via conduit 165 to the first clutch 6 and to the shift valve 60 through conduit 165 and a branch conduit 70. The port 162d is further connected via conduits 165 and 140 to the throttle valve 130. The port 162e is connected through conduit 87 to the chamber 84b of the second shift valve 80. Both ports 162g and 162h are connected to the line pressure conduit 45 via its branch conduits. The other ports 162f and 162j are both connected to the reservoir 42 through conduits, not shown.

The operation of the embodiment disclosed within FIG. 2 will now be described hereinbelow in detail. When the spool 160 of the manual shift valve 44 is kept in the posion L, the line pressure from the pump 4 or 16 is regulated by means of the regulator valve 31 and is supplied to conduit 45. Such line pressure within conduit 45 is able to be transmitted via port 162d and conduit 66 to the shift valve 60 and also to be transmitted via port 162c and conduit 67 to the shift valve. The second brake 19 is thus able to be engaged as a result of the line pressure being transmitted through the conduit 66, chamber 63d and conduit 79 to the brake 19. The line pressure is also supplied to the chambers 63a and 64b. It should be noted that the spool 61 of the valve 60 continues to occupy the position illustrated until the spool 160 of the manual shift valve 44 is shifted to the other positions and the governor pressure in the chamber 63e increases to a predetermined value. For such purpose, the maximum of the governor pressure is so calculated in design that a combined force of the pressures within the chambers 63a, 63b and 63c may safely overcome that maximum. The other brake 18 is kept in the rest position with its engaging chamber 18e connected via conduit 69, port 64c and 64a to the reservoir under the atmospheric pressure. The second clutch 9 also is kept in the rest position with its engaging chamber connected via conduit 86, chamber 84a of the second shift valve 80, conduit 54, ports 162a and 162j of the manual shift valve to the reservoir. The first clutch 6 is applied fluid line pressure via conduit 165 and port 162d from the conduit 45, thus being in act.

Referring to FIG. 1, the first clutch 6 and the second brake 19 are in the other clutch and brake are in rest position so that the low position of the gear trains is effected. In the position, the output shaft 13 is driven at the slowest rotational speed and high ratio differential is obtained.

When the manual shift valve 44 is displaced from the above mentioned position to the position designated 2 in FIG. 2, the port 162b is closed by land 161b to interrupt fluid communication between the second brake 19 and the line pressure. The brake 19 is thus released. The chamber 63b of the shift valve 60 is also isolated from the line pressure to thereby make the upward urging force a lesser one as compared with the precedingly applied one. Such urging force is calibrated to be overcome by a predetermined threshold governor pressure in the chamber 63e. There is no change for any other clutch and brake in applying fluid pressure until the spool 61 is downward shifted.

Although the brake 19 is released as above described, the speed changing gear trains in FIG. 1 may remain in the same mode of operation as in the low position, until the spool 61 of the valve 60 is downward shifted by an increase of the governor pressure over the calibration threshold value.

When the governor pressure exceeds the calibration threshold value and overcomes the lesser urging force exerted by the pressures within the chambers 63a and 63c, the spool is downward shifted and the ports 64c and 64d are connected. The engaging chamber 18e of the brake 18 is connected to the line pressure conduit 45 through conduit 69, valve 60, conduit 70, conduit 165, ports 162d and 162g. Such line pressure is also transmitted through the branch conduit 53 to the chamber 51 of the first regulator valve 31, output line pressure from the regulator valve 31 being thus lowered by decrease of the biasing force of spring 55. This is effective for achieving a shockless initiation of operation of the brake 18. By the downward shifting of the spool 61, the brake 19 is connected to the reservoir via conduit 79, chamber 63d between the lands 61a and 61b which is displaced to connect to port 64a leading to the reservoir. The clutches 6 and 9 are still remain in the preceding mode of operation.

It should be noted that in the above mentioned operation, the throttle pressure supplied to chamber 63c varies in proportion to the amount by which the pedal 134 is depressed. It will be understand that such variation of the throttle pressure conveniently timingly affects the spool 61, in that the greater of the throttle pressure the greater will be the governor pressure. A proper operation of the spool 61 is thus achieved.

When the spool 160 of the manual shift valve 44 is in driving position designated D in FIG. 2, the two ports 162d and 162e are connected via chamber between the two lands 161c and 161d and port 162g to the line pressure conduit 45. The ports 162a, 162b and 162c are all isolated from the line pressure and connected via port 162j to the atmospheric pressure in the reservoir. The first shift valve 60 and second shift valve 80 are both in the position until the governor pressure in the chamber 63e exceeds a first and second predetermined threshold values respectively. It will be seen that both spools 61 and 81 are urged in the upward direction by the throttle pressure alone in the chambers 63c and 84d respectively.

In the illustrated position, increase of the governor pressure over the first threshold value causes the spool 61 to be downward shifted and the low position is effected in the manner described in the foregoing as to the first mode of operation of the gearing trains.

When the governor pressure exceeds the second predetermined threshold value (or reached, the spool 81 is shifted downward by the governor pressure against the biasing force of the calibration threshold of the spring 83 and the throttle pressure in the chamber 84d. The land 81a of the spool 81 blocks communication between the chamber 84a and reservoir via conduit 54, ports 162a and 162j while the chamber 84a interconnects the manual shift valve 44 and the clutch 9 as well as the disengaging chamber 18d of the brake. It will be understood that both brakes 18 and 19 are now released and the clutch 9 becomes active. The other clutch 6 is also in act under the line pressure supplied through conduit 165 which in the position connects to the port 162g of the manual shift valve 44. It should be noted that the engaging chamber 18e of the brake 18 is still communicated via conduit 69 with port 64c leading to reservoir 42 so that engagement of the brake 18 is permissible.

FIG. 1 is referred to again, for understanding the top position of the gear trains. In the top position, the first and second sun gears are together driven in integral and the carrier 12 is free to rotate in the rotationally inoperative direction of the brake 20. The lowest ratio differential is achieved for the gear trains. The higher travelling speed of the behicle may be thus achieved.

Reverse may take place from the second position to the low position or from the top position to the second position in dependency upon the variation of the governor pressure.

When the spool 160 of the manual shift valve 44 is in the position designated N in FIG. 2, each clutch and each brake is freed from the line pressure and no torque is transmitted from the input shaft 1 to the output shaft 13. The neutral position is thus effected.

When the spool 160 of the manual shift valve 44 is in rear travelling position designated R, the three ports 162a, 162b and 162c are connected to the port 162h leading to the line pressure conduit 45 and the other ports 162d and 162e are connected to the port 162f leading to the reservoir through a conduit, not shown. The line pressure is transmitted through conduits 66 and 67 to the first valve 60 which is kept in the same position as described with respect to the L position of the manual shift valve 44. The brake 19 is thus in act. The line pressure is also transmitted via port 162a, conduit 54, chamber 84a, conduit 86 and its branch conduits to the clutch 9 and disengaging chamber 18d of the brake 18. The first clutch 6 is connected via conduit 165, port 162d and 162f to the reservoir 42.

Referring to FIG. 1, the brake 19 and second clutch 9 are in act and the clutch 6 and brake 18 are in the rest position. The carrier 12 remains stationary and the second sun gear 8 is driven alone. It will be understand that the output shaft 13 is accordingly driven in the inverse rotational direction. In the mode of operation, the engaging chamber 18e of the brake 18 is connected via conduit 69, port 64c and 64a to the reservoir to permit disengagement of the brake 18. The line pressure within the conduit 54 is transmitted to chamber 52 of the regulator valve 31 so that a biasing force is applied to the land 50c in addition to that of the spring 55. As a result, the regulated output line pressure is increased and the brake 19 and clutch 9 is tightened further firmly by such increased line pressure. The rear position driving may thus transmit larger torque by such large tightening force resulting from the line pressure in the clutch 9 and brake 19.

It will be noted that in the rear driving position, the throttle pressure is not transmitted to the shift valve 80 and in turn to the shift valve 60. The spool 81 of the valve 80 is accordingly biased in the upward direction by the spring 83 alone, while the line pressure is transmitted to hold the spool of the shift valve 60 in the upward shifted position. Although upward urging force is smaller one for the spool of the valve 80, in the rearward driving position, such fact is negligible in view of little governor pressure due to the slow rearward travelling speed of the vehicle.

The throttle valve 130 is normally supplied the line pressure, except when the manual valve is in the rearward travelling position, from the conduit 45 via manually shift valve 44, conduit 165 and 140. When the line pressure is supplied from the port 136e, the pressure is applied via ports 136b and 136c to the right hand face of the land 132b to move land 136b to the left against the biasing force of the spring 133, thus blocking fluid flow from the port 136e. If the line pressure within the throttle valve 130 exceeds the calibration threshold of the spring 133, the spool 132 is moved further to the left as viewed in FIG. 2 until the land 132a opens the port 136h leading to the reservoir to allow the line pressure to escape. After escaping, the line pressure in the valve decreases and the spool again restores to its original position and the port 136h is thus closed and port 136e is reopened. Such cycle of operation is flutteringly repeated until the line pressure is regulated as an output throttle pressure at an amount which is proportional to the amount by which the spring 133 is compressed by the pedal. Such throttle pressure is transmitted via check valve 138, conduit 139 to the chamber 84d of the valve 80 and in turn to the chamber 63c of valve 60 through conduit 71.

For proper operation of the shift valves 60 and 80, the throttle pressure in the chamber 84d and 63c must be changeable in response to varying governor pressure. The operation of the throttle valve 130 may meet such requirement in dependency upon the amount of depression of the pedal.

The creep preventing valve 90 operates in association with the modulator 111 as follows.

The throttle pressure is normally applied via port 136b, check valve 138, conduit 137 and port 93e to the chamber 95d of the creep preventing valve 90. When the calibration threshold of the spring 92 is overcome by a combined force of the governor pressure and throttle pressure in the chamber 95c and 95d respectively, the spool 91 is upward shifted against the spring so that communication between the ports 93c and 93b is blocked by the land 91b. The piston 112 of the modulator moves to the left as viewed in FIG. 2 to compress the spring 113 and oil pressure within the modulator 111 is increased up to an amount of the line pressure. Such line pressure is sufficient to properly actuate the clutches and brakes, as hereinbefore described.

When the pedal 134 is suddenly depressed, namely the so-called "kick-down" operation is performed by the driver, the land 131b of the plug 131 of the valve permits interconnection between the ports 136a and 136d, while the port 136f is closed. As a result, the line pressure is transmitted to the chamber defined between the two lands 131a and 131b. The ball of the check valve 138 is displaced to interconnect the port 136a and the conduits 137 and 139 and to block communication between the ports 136b and 136c and conduits 137 and 139. The line pressure is directly transmitted to both chambers 95d and the chamber 84d and in turn to the chamber 63c. This is effective to promptly apply fluid pressure of higher value which will sufficiently proportional for suddenly increasing governor pressure in the chamber 63e.

In case where the combined force of the pressures within the chambers 95b and 95d is smaller than the calibrated threshold value, the spool 91 is shifted downward and interconnects the ports 93c and 93b thereby to allow the line pressure to escape to the reservoir via modulator 111, conduit 118, ports 93c and 93b. As a result, the line pressure in the conduit 45 is decreased by an amount which is insufficient to actuate the clutch and brakes to thereby prevent creeping of the vehicle when the vehicle is stopping the travelling and the engine is idling.

The well known multiple-disk friction clutches and brakes are preferred for achieving the operation of the invention, but the present invention is not restricted to this type brakes and clutches.

Figure 3:
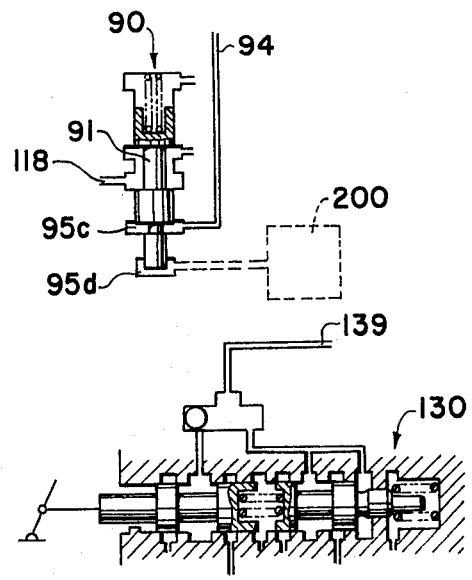
FIG. 3 is a similar illustration of another embodiment.

In FIG. 3, there is shown another embodiment of the creep preventing valve 90 as by the dotted line. The reference character 200 indicate a pressure source such as a pump which supplies fluid pressure increasing and decreasing by an amount which is proportional to the rotational speed of the vehicle engine. Such output pressure is supplied to the chamber 95d of the valve 90 to actuate the valve 90 in the same manner as described in the foregoing.

What is claimed is:

1. A fluid pressure control system for automatic transmission, comprising;
   a fluid pressure source;
   a fluid pressure regulating valve for regulating the hydraulic fluid from said fluid pressure source to a particular line pressure;
   a plurality of frictional engaging means actuated by said line pressure from said fluid pressure regulating valve for attaining a particular gear ratio within the gear trains of said transmission interposed between an input shaft and an output shaft;
   a governor valve for generating a governor pressure which is increased or decreased in response to the rotational speed of said output shaft;
   a manual shift valve operatively connected to said fluid pressure regulating valve for supplying said line pressure to said plurality of frictional engaging means;
   a throttle valve fluidically connected to said manual shift valve for generating a throttle pressure responsive to an engine throttle valve;
   shift valve means actuated in response to said governor pressure and said throttle pressure for automatically selectively actuating said plurality of frictional engaging means; and
   a pump means to generate an output pressure which is proportional to rotational speed of said engine; and
   a creep preventing valve actuated in response to said governor pressure and said output pressure which is proportional to rotational speed of said engine for automatically reducing said line pressure by an amount which is unable to actuate said plurality of frictional engaging means.

2. A fluid pressure control system for automatic transmission, comprising a fluid pressure source;

a fluid pressure regulating valve for regulating the hydraulic fluid from said fluid pressure source to a particular line pressure, a plurality of frictional engaging means actuated by said line pressure from said fluid pressure regulating valve for attaining a particular gear ratio within the gear trains of said transmission interposed between an input shaft and an output shaft;

a governor valve for generating a governor pressure which is increased or decreased in response to the rotational speed of said output shaft;

a manual shift valve operatively connected to said fluid pressure regulating valve for supplying said line pressure to said plurality of frictional engaging means;

a throttle valve fluidically connected to said manual shift valve for generating a throttle pressure responsive to an engine throttle valve;

shaft valve means actuated in response to said governor pressure and said throttle pressure for automatically selectively actuating said plurality of frictional engaging means; and a creep-preventing valve (90) actuated by sensing total pressure of said governor pressure and said throttle pressure to thereby leave said fluid pressure regulating valves inactive when a value of said total pressure is lower than a predetermined value.

3. A fluid pressure control system for automatic transmissions as set forth in claim 2 which further comprises modulator means interposed between said regulator valve and said creep preventing valve for modulating said line pressure transmitted to said creep preventing valve.

4. A fluid pressure control system for automatic transmission, comprising a fluid pressure source;

a fluid pressure regulating valve for regulating the hydraulic fluid from said fluid pressure source to a particular line pressure;

a plurality of frictional engaging means actuating by said line pressure from said fluid pressure regulating valve for attaining a particular gear ratio within the gear trains of said transmission interposed between an input shaft and an output shaft;

a governor valve for generating a governor pressure which is increased or decreased in response to the rotational speed of said output shaft;

a manual shift valve operatively connected to said fluid pressure regulating valve for supplying said line pressure to said plurality of frictional engaging means;

a throttle valve fluidically connected to said manual shift valve for generating a throttle pressure responsive to an engine throttle valve;

shift valve means actuated in response to said governor pressure and said throttle pressures for automatically selectively actuating said plurality of frictional engaging means;

a creep-preventing valve (90) actuated by sensing total pressure of said governor pressure and said throttle pressure to thereby leave said fluid pressure regulating valves inactive when a value of said total pressure is lower than a predetermined value, said creep-preventing valve (90) including a spool (91), a restoring spring (92) for said spool, and two ports (93b) and (93c) leading respectively to atmospheric pressure and said line pressure, said spool having means to interconnect or interrupt said two ports and two lands exposed respectively to said throttle pressure and governor pressure both applied to move said spool in the same direction against said restoring spring so as to interrupt said two ports whereby said line pressure is kept lowered to the atmospheric pressure when total value of said throttle pressure and said governor pressure is lower than a predetermined value which is determined by said restoring spring 92.

* * * * *